US012633697B2

(12) United States Patent
Wang et al.

(10) Patent No.: US 12,633,697 B2
(45) Date of Patent: May 19, 2026

(54) CONNECTION TERMINAL, FINGER PROTECTIVE CAP, CONNECTION TERMINAL ASSEMBLY, CABLE ASSEMBLY, AND CHARGING SEAT

(71) Applicants: Tyco Electronics (Suzhou) Ltd., Suzhou (CN); Tyco Electronics Technology (SIP) Ltd., Suzhou (CN); Tyco Electronics (Shanghai) Co., Ltd., Shanghai (CN)

(72) Inventors: Jinshun (Jet) Wang, Suzhou (CN); Fangyue (Jason) Zhu, Shanghai (CN); Han Wu, Suzhou (CN); Ming Xu, Suzhou (CN); Jian Yang, Suzhou (CN); Jianwen (Gerry) Zhang, Suzhou (CN); Weidong Zhang, Shanghai (CN)

(73) Assignees: Tyco Electronics (Suzhou) Ltd., Suzhou City (CN); Tyco Electronics Technology (SIP) Co., Ltd., Suzhou (CN); Tyco Electronics (Shanghai) Co., Ltd., Shanghai (CN)

( * ) Notice: Subject to any disclaimer, the term of this patent is extended or adjusted under 35 U.S.C. 154(b) by 409 days.

(21) Appl. No.: 18/325,669

(22) Filed: May 30, 2023

(65) Prior Publication Data

US 2023/0387623 A1 Nov. 30, 2023

(30) Foreign Application Priority Data

May 30, 2022 (CN) ......................... 202221318747.8

(51) Int. Cl.
*H01R 13/44* (2006.01)
*H01R 13/04* (2006.01)

(52) U.S. Cl.
CPC ............. *H01R 13/44* (2013.01); *H01R 13/04* (2013.01)

(58) Field of Classification Search
CPC ........ H01R 13/04; H01R 13/44; H01R 13/05; H01R 13/4361
USPC ................ 439/722, 709, 625, 702, 738, 750
See application file for complete search history.

(56) References Cited

U.S. PATENT DOCUMENTS 11,336,046 B2 * 5/2022 Saito .................... H01R 13/639
11,581,676 B2 * 2/2023 Raybold .................. H01R 4/20
2015/0155650 A1 * 6/2015 Larssen ................... H01R 11/11 439/271
2015/0229054 A1 * 8/2015 Fukushima ............ H01R 13/04 439/891
2017/0203092 A1 * 7/2017 Ryan ...................... A61B 90/70
2021/0187267 A1 * 6/2021 Jiang ......................... A61L 2/18

* cited by examiner

*Primary Examiner* — Tulsidas C Patel
*Assistant Examiner* — Carlos E Lopez-Pagan
(74) *Attorney, Agent, or Firm* — Barley Snyder

(57) ABSTRACT

A finger protective cap for fitting on an installation part at an end of a connection terminal includes a peripheral wall, an end wall connected to an end of the peripheral wall, and an insertion post located in the inner cavity and connected to the end wall. The peripheral wall and end wall define an inner cavity accommodating the installation part. The insertion post is insertable into an insertion hole on the installation part and interference fit with a hole wall of the insertion hole. The inner cavity has an opening opposite to the end wall to allow the installation part to be inserted into the finger protective cap through the opening.

18 Claims, 7 Drawing Sheets

CONNECTION TERMINAL, FINGER PROTECTIVE CAP, CONNECTION TERMINAL ASSEMBLY, CABLE ASSEMBLY, AND CHARGING SEAT

CROSS-REFERENCE TO RELATED APPLICATION

This application claims the benefit of the filing date under 35 U.S.C. § 119(a)-(d) of Chinese Patent Application No. 202221318747.8, filed on May 30, 2022.

FIELD OF THE INVENTION

The present invention relates to a connection terminal, a finger protective cap suitable for fitting on the end of the connection terminal, a connection terminal assembly including the connection terminal and the finger protective cap, a cable assembly including the connection terminal and the finger protective cap, and a charging seat including the connection terminal and the finger protective cap.

BACKGROUND

In the prior art, the charging terminal in the charging seat of a new energy vehicle typically includes a columnar body part, an installation part protruding from one end of the columnar body part for installing a finger protective cap, and a welding portion connected to the other end of the columnar body part. The welding portion of the charging terminal is usually welded to a cable conductor by ultrasonic welding.

In the prior art, the diameter of the installation part of the charging terminal is smaller than the columnar body part. Therefore, there is stress concentration at the root of the installation part connected to the columnar body part, and since the installation part is usually a solid body, the mass is relatively large. When ultrasonic welding is used for cable conductor and charging terminal, the charging terminal will have high-frequency vibration, which will lead to fatigue and fracture of the installation part at the end of the charging terminal.

Moreover, in the prior art, during the mating process between the charging terminal and the mating charging terminal, the finger protective cap installed on the end of the charging terminal is easily detached from the installation part of the charging terminal, which can lead to the risk of electric shock due to human fingers touching the end of the charging terminal.

SUMMARY

A finger protective cap for fitting on an installation part at an end of a connection terminal includes a peripheral wall, an end wall connected to an end of the peripheral wall, and an insertion post located in the inner cavity and connected to the end wall. The peripheral wall and end wall define an inner cavity accommodating the installation part. The insertion post is insertable into an insertion hole on the installation part and interference fit with a hole wall of the insertion hole. The inner cavity has an opening opposite to the end wall to allow the installation part to be inserted into the finger protective cap through the opening.

BRIEF DESCRIPTION OF THE DRAWINGS

Features of the present invention will become more apparent by describing in detail exemplary embodiments thereof with reference to the accompanying drawings, in which.

DETAILED DESCRIPTION OF EXEMPLARY EMBODIMENTS

Figure 1:
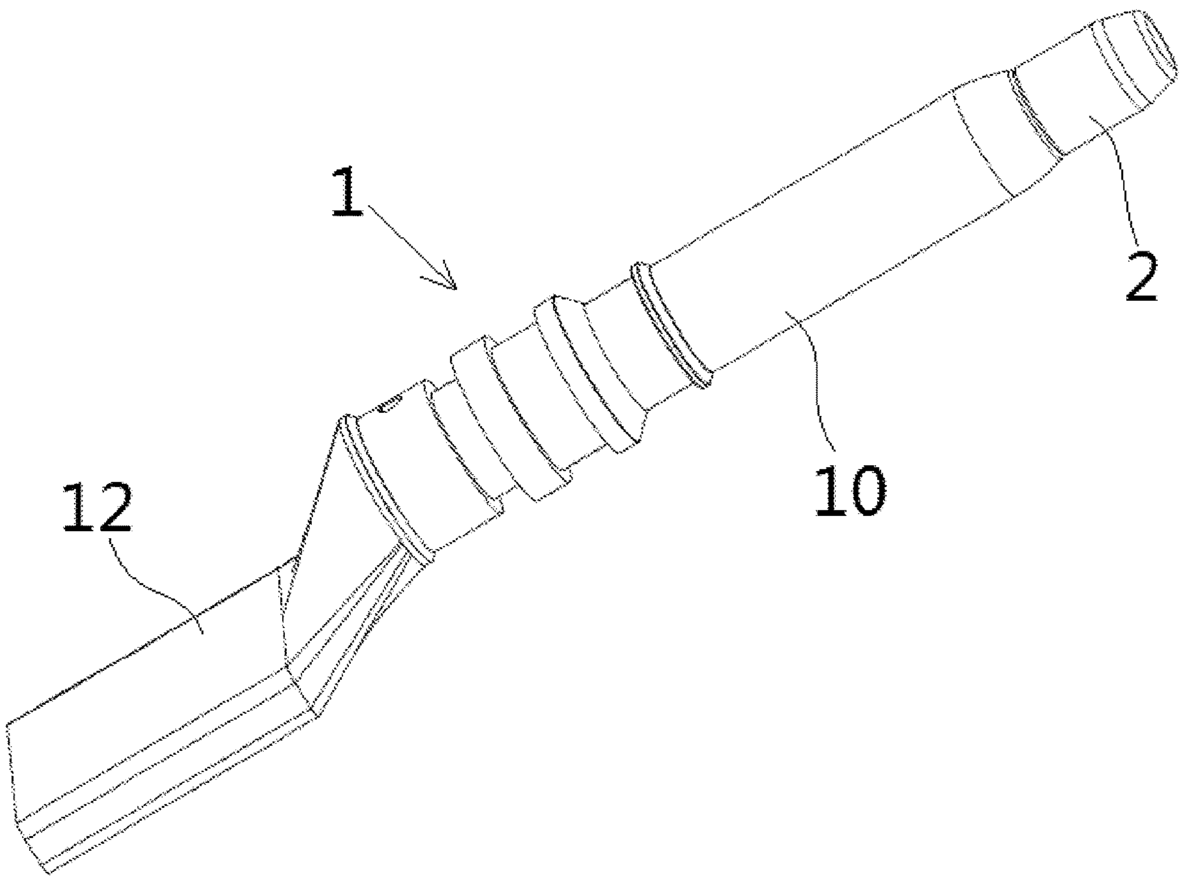
FIG. 1 shows an illustrative assembly view of a connection terminal and a finger protective cap according to an exemplary embodiment of the present invention.
Figure 2:
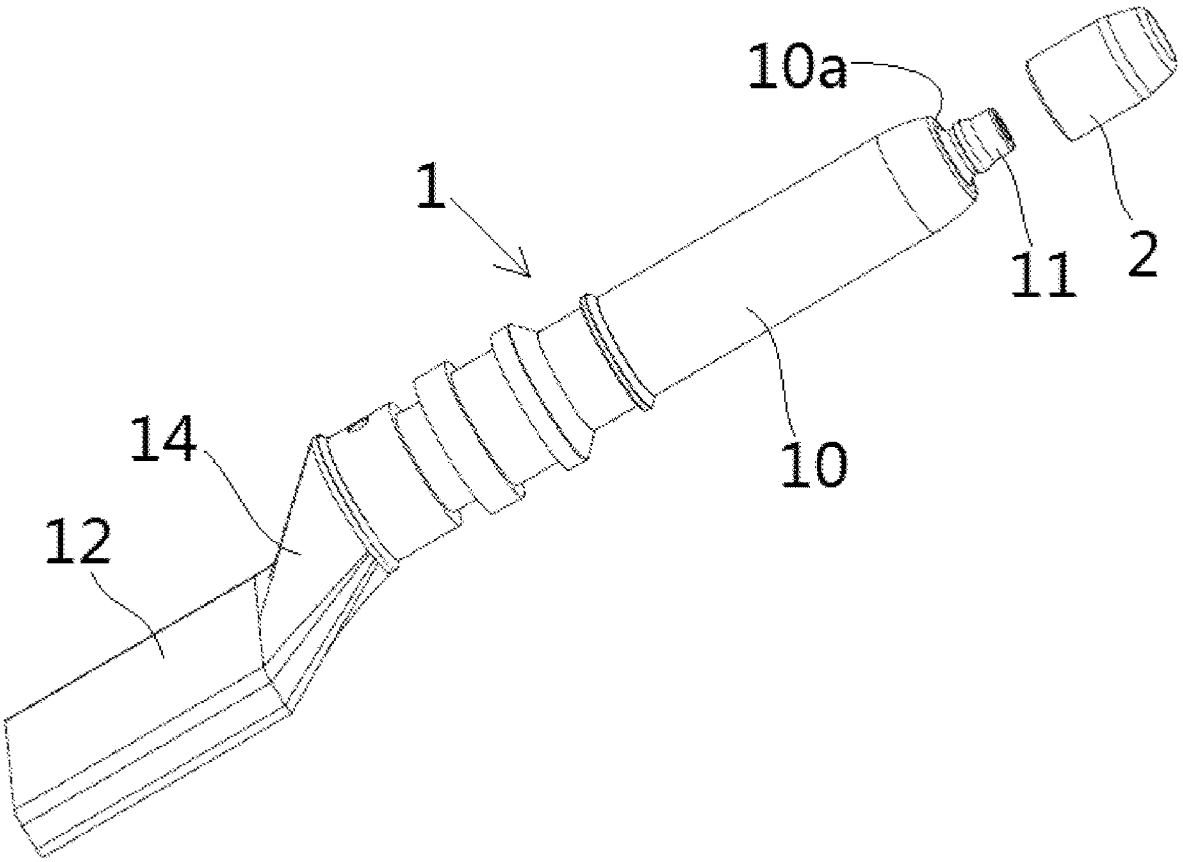
FIG. 2 shows an illustrative exploded view of a connection terminal and a finger protective cap according to an exemplary embodiment of the present invention.

Exemplary embodiments of the present disclosure will be described hereinafter in detail with reference to the attached drawings, wherein like reference numerals refer to like elements. The present disclosure may, however, be embodied in many different forms and should not be construed as being limited to the embodiments set forth herein; rather, these embodiments are provided so that the present disclosure will convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

As shown in FIGS. 1 to 4, in the illustrated embodiment, the connection terminal 1 includes a body part 10 and an installation part 11. The body part 10 is suitable for inserting into a mating terminal for electrical contact with the mating terminal. The installation part 11 is suitable for inserting into a finger protective cap 2 for installing the finger protective cap 2.

As shown in FIGS. 1 to 4, in the illustrated embodiments, the installation part 11 is formed on and protrudes from the end face 10*a* of one end of the body part 10. An insertion hole 112 is formed on the installation part 11, which is suitable for matching with an insertion post 22 in the finger protective cap 2. In the illustrated embodiment, due to the formation of an insertion hole 112 on the installation part 11, the weight of the installation part 11 is reduced, thereby preventing its fracture during high-frequency vibration.

Figure 4:
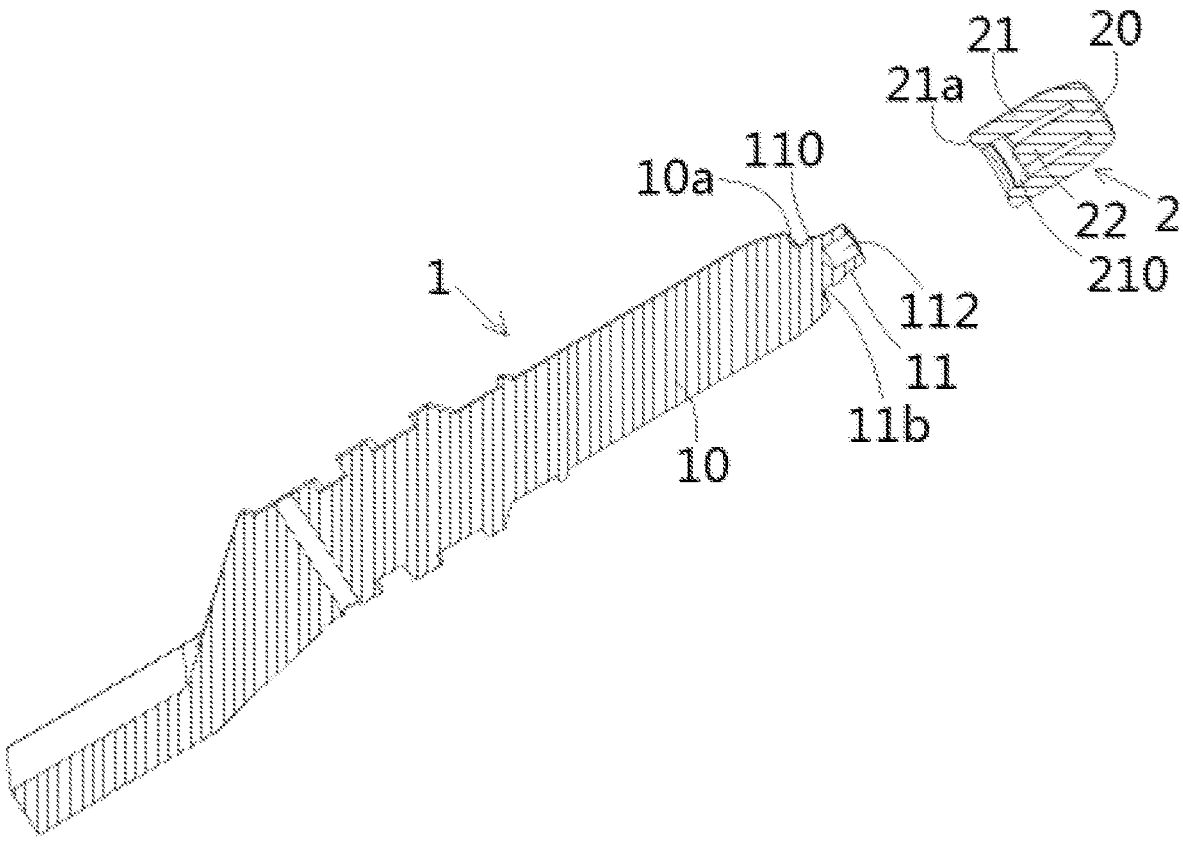
FIG. 4 shows an exploded cross-sectional view of a connection terminal and a finger protective cap according to an exemplary embodiment of the present invention.
Figure 5:
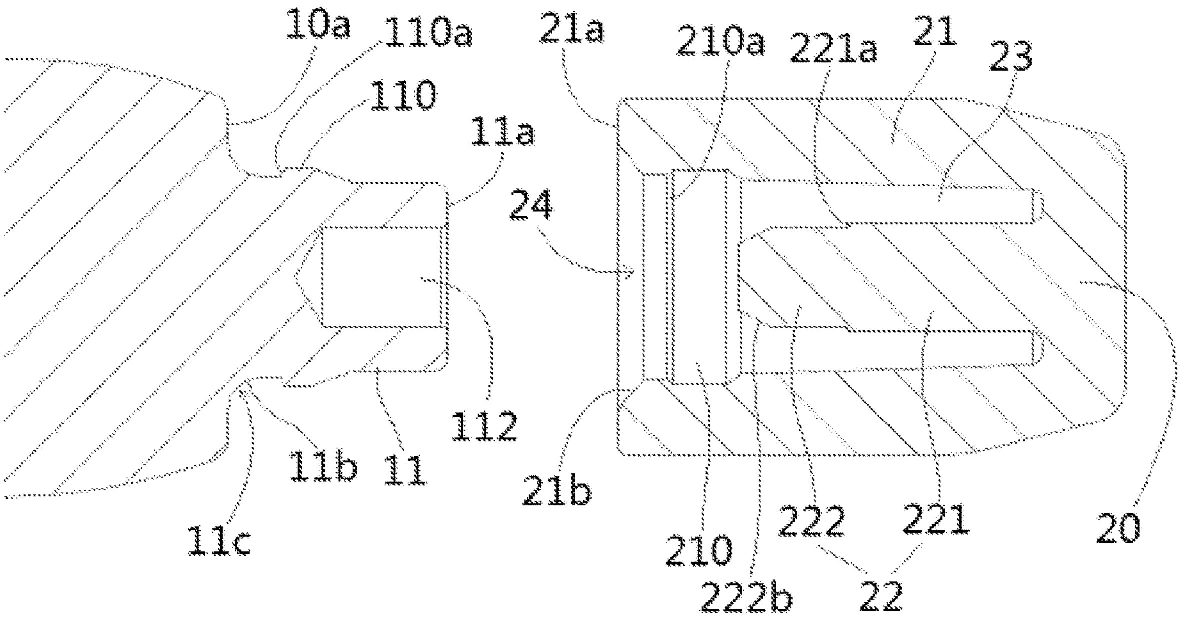
FIG. 5 shows a partially enlarged cross-sectional view of a connection terminal and a finger protective cap according to an exemplary embodiment of the present invention, wherein the finger protective cap has not yet been assembled onto the connection terminal.

As shown in FIGS. 4 and 5, in the illustrated embodiments, the root of the installation part 11 connected to the end face 10*a* of the body part 10 is formed into an arc-shaped connection part 11*b*. The installation part 11 and the body part 10 are connected to each other by the arc-shaped connection part 11*b* to prevent stress concentration at the root of the installation part 11. For example, in the illustrated embodiment, as shown in FIG. 5, an arc-shaped chamfer 11*c* is formed at the root of the installation part 11 connected to the end face 10*a* of the body part 10 to prevent stress concentration at the root of the installation part 11. This can prevent the root of the installation part 11 from breaking due to high-frequency vibration. The insertion hole 112 reduces the mass of the installation part 11, which can effectively prevent the installation part 11 from breaking due to high-frequency vibration.

As shown in FIGS. 1 to 6, in the illustrated embodiment, the installation part 11 extends along an axial direction of the body part 10, the end face 10*a* of the body part 10 extends along a radial direction of the body part 10, and the cross section of the arc-shaped chamfer 11*c* is an arc with a central angle equal to 90 degrees.

Figure 6:
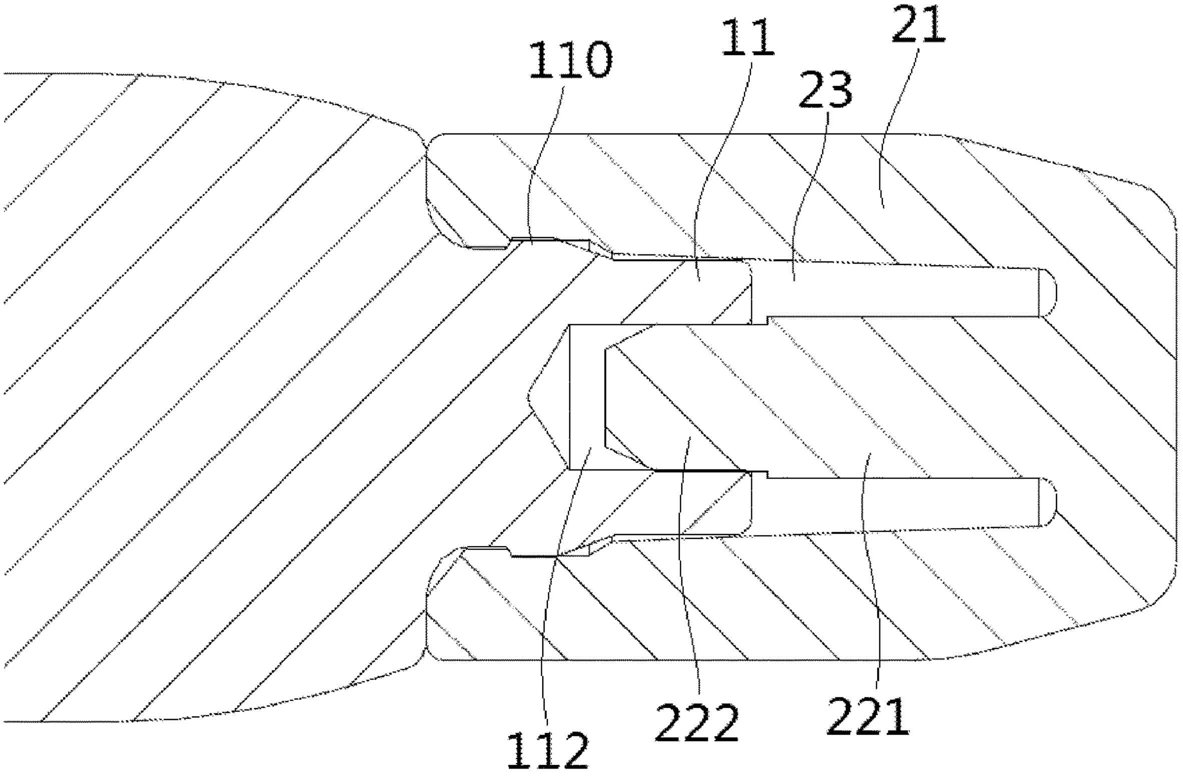
FIG. 6 shows a partially enlarged cross-sectional view of a connection terminal and a finger protective cap according to an exemplary embodiment of the present invention, wherein the finger protective cap has been assembled onto the connection terminal.

As shown in FIGS. 4 to 6, in the illustrated embodiments, a radial protrusion 110 is formed on the outer peripheral surface of the installation part 11, and the radial protrusion 110 is suitable for being engaged in a radial recess 210 on an inner peripheral surface of the finger protective cap 2. A blocking surface 110*a* is formed on one side of the radial protrusion 110 of the installation part 11, and a mating blocking surface 210*a* is formed on one side of the radial recess 210 in the finger protective cap 2. The blocking surface 110*a* is suitable for leaning against the mating blocking surface 210*a* to prevent the finger protective cap 2 from being removed from the installation part 11.

In the illustrated embodiment, the outer diameter of the radial protrusion 110 on the installation part 11 is slightly larger than the inner diameter of the finger protective cap 2 at the radial recess 210. When the finger protective cap 2 is sleeved on the installation part 11, the radial protrusion 110 on the installation part 11 is interference fit with the inner peripheral surface of the finger protective cap 2 to increase the engagement force between the finger protective cap 2 and the installation part 11.

As shown in FIGS. 5 and 6, in the illustrated embodiments, when the finger protective cap 2 is installed on the installation part 11, the end face 10*a* of the body part 10 is pressed against the end face 21*a* of the open end of the finger protective cap 2 and is covered by the finger protective cap 2 to prevent human fingers from touching the end face 10*a* of the body part 10. In the illustrated embodiment, when the finger protective cap 2 is installed on the installation part 11, the end face 11*a* of the installation part 11 usually does not come into contact with the finger protective cap 2, thereby not limiting the installation position of the finger protective cap 2.

The inner diameter of the insertion hole 112 on the installation part 11 is slightly smaller than the outer diameter of the insertion post 22 in the finger protective cap 2. When the finger protective cap 2 is sleeved on the installation part 11, the inner peripheral surface of the insertion hole 112 on the installation part 11 is interference fit with the insertion post 22 in the finger protective cap 2.

As shown in FIGS. 1 to 6, in the illustrated embodiment, the connection terminal 1 further includes a welding end 12, which is connected to the other end of the body part 10 and adapted to be welded to a cable conductor.

As shown in FIGS. 1 to 6, in the illustrated embodiments, the welding end 12 is flat and the body 10 is cylindrical. The welding end 12 is radially offset to one side relative to the body part 10, so that the central axis of the cable conductor welded to the top surface of the welding end 12 coincides with the central axis of the body 10 or the distance between the two is less than a predetermined value.

As shown in FIGS. 1 to 6, in the illustrated embodiment, the connection terminal 1 further includes a connection portion 14, which is connected between the other end of the body part 10 and one end of the welding end 12 and extends obliquely relative to the body part 10.

As shown in FIGS. 1 to 6, in the illustrated embodiment, the connection terminal 1 is an integral component. For example, the connection terminal 1 can be an integral machined part or an integral stamping formed part.

As shown in FIGS. 1 to 6, in the illustrated embodiments, the extension length of the installation part 11 in the axial direction of the body part 10 is not greater than half, one-third, or quarter of the axial extension length of the finger protective cap 2. In this way, the axial extension length of the installation part 11 can be reduced to prevent fracture of the installation part 11 due to high-frequency vibration.

Figure 3:
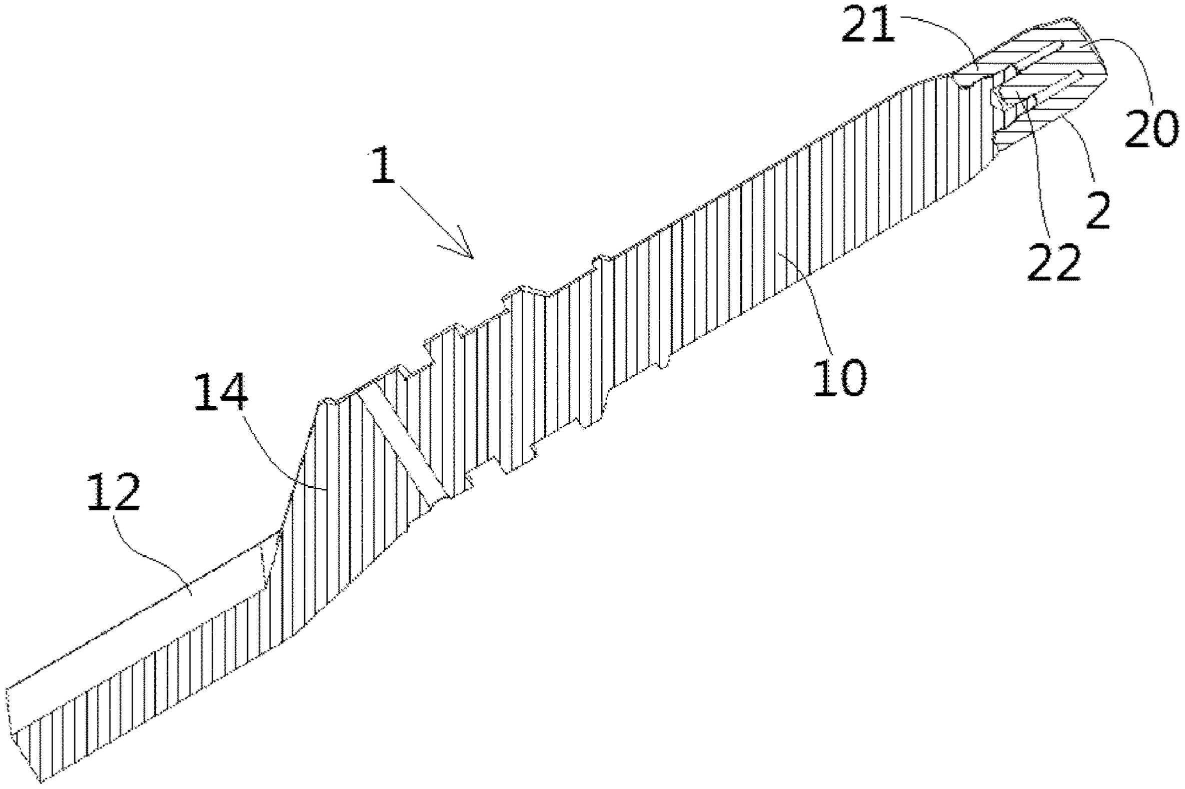
FIG. 3 shows an assembly cross-sectional view of a connection terminal and a finger protective cap according to an exemplary embodiment of the present invention.

As shown in FIGS. 1 to 6, in an exemplary embodiment of the present invention, a connection terminal assembly is also disclosed. The connection terminal assembly includes: the connection terminal 1 and the finger protective cap 2 as shown in the attached figures. The finger protective cap 2 is installed on the installation part 11 at the end of the connection terminal 1. An insertion post 22 is formed inside the finger protective cap 2, as shown in FIGS. 3-5, which is inserted into the insertion hole 112 on the installation part 11.

As shown in FIGS. 1 to 6, in an exemplary embodiment of the present invention, a cable assembly is also disclosed. The cable assembly includes a cable and the connection terminal 1 shown in the attached figures and described above. The cable has an exposed cable conductor. The connection terminal 1 has a welding end 12. The cable conductor is welded to the welding end 12 of the connection terminal 1. For example, the cable conductor can be welded to the welding end 12 of the connection terminal 1 by ultrasonic welding. The cable assembly also includes a finger protective cap 2 as shown in the attached figures, which is installed on the installation part 11 at the end of the connection terminal 1.

As shown in FIGS. 1 to 6, in an exemplary embodiment of the present invention, a charging seat is also disclosed. The charging seat includes a housing and a connection terminal 1 as shown in the attached figures and described above. The connection terminal 1 is inserted into the housing for matching with a mating terminal in a charging gun. The charging seat also includes a finger protective cap 2. The finger protective cap 2 is installed on the installation part 11 at the end of the connection terminal 1 to prevent human fingers from touching the end of the connection terminal 1. The charging seat also includes a cable, which has an exposed cable conductor. The cable conductor is welded to the welding end 12 of the connection terminal 1. In this way, the connection terminal 1 can be electrically connected to a charging battery through a cable.

As shown in FIGS. 1 to 7, in an exemplary embodiment of the present invention, a finger protective cap 2 is also disclosed. The finger protective cap 2 is suitable for fitting on the installation part 11 at the end of the connection terminal 1 shown in the attached figures, to prevent human fingers from touching the end of the connection terminal 1.

As shown in FIGS. 1 to 7, in an exemplary embodiment of the present invention, a finger protective cap 2 is also disclosed, which is used to fit on the installation part 11 at the end of the connection terminal 1. Finger protective cap 2 mainly includes: a peripheral wall 21, an end wall 20, and an insertion post 22. The end wall 20 is connected to one end of the peripheral wall 21. The end wall 20 and the peripheral wall 21 define an inner cavity 23 suitable for accommodating the installation part 11. The insertion post 22 is located in the inner cavity 23 and connected to the end wall 20 for insertion into the insertion hole 112 on the installation part 11. The insertion post 22 is adapted to be interference fit with the hole wall of the insertion hole 112. Therefore, the engagement force between the finger protective cap 2 and the connection terminal 1 has been improved, which can effectively prevent the finger protective cap 2 from falling off the connection terminal 1 and improve the safety of the product.

As shown in FIG. 5, the inner cavity 23 of the finger protective cap 2 has an opening 24 opposite the end wall 20 to allow the installation part 11 to be inserted into the finger protective cap 2 through the opening 24. A radial recess 210 is formed on the inner peripheral surface of the peripheral wall 21 of the finger protective cap 2, which is suitable for engagement with the radial protrusion 110 on the outer peripheral surface of the installation part 11.

As shown in FIGS. 1 to 7, in the illustrated embodiments, a mating blocking surface 210*a* is formed on one side of the radial recess 210, which is suitable for pressing against the blocking surface 110*a* of the radial protrusion 110 to prevent the finger protective cap 2 from being removed from the installation part 11.

As shown in FIGS. 1 to 7, in the illustrated embodiment, the inner diameter of the finger protective cap 2 at the radial recess 210 is slightly smaller than the outer diameter of the radial protrusion 110 on the installation part 11. When the finger protective cap 2 is sleeved on the installation part 11, the inner peripheral surface of the finger protective cap 2 is interference fit with the radial protrusion 110 to increase the engagement force between the finger protective cap 2 and the installation part 11.

As shown in FIGS. 1 to 7, in the illustrated embodiments, the end face 21*a* of the peripheral wall 21 of the finger protective cap 2 is suitable to rest against the end face 10*a* of the body part 10 connected to the terminal 1, used to cover the end face 10*a* of the body part 10 to prevent human fingers from touching the end face 10*a* of the body part 10. In the illustrated embodiment, when the finger protective cap 2 is installed on the installation part 11, the end face 11*a* of the installation part 11 usually does not come into contact with the finger protective cap 2, thereby not limiting the installation position of the finger protective cap 2.

Figure 7:
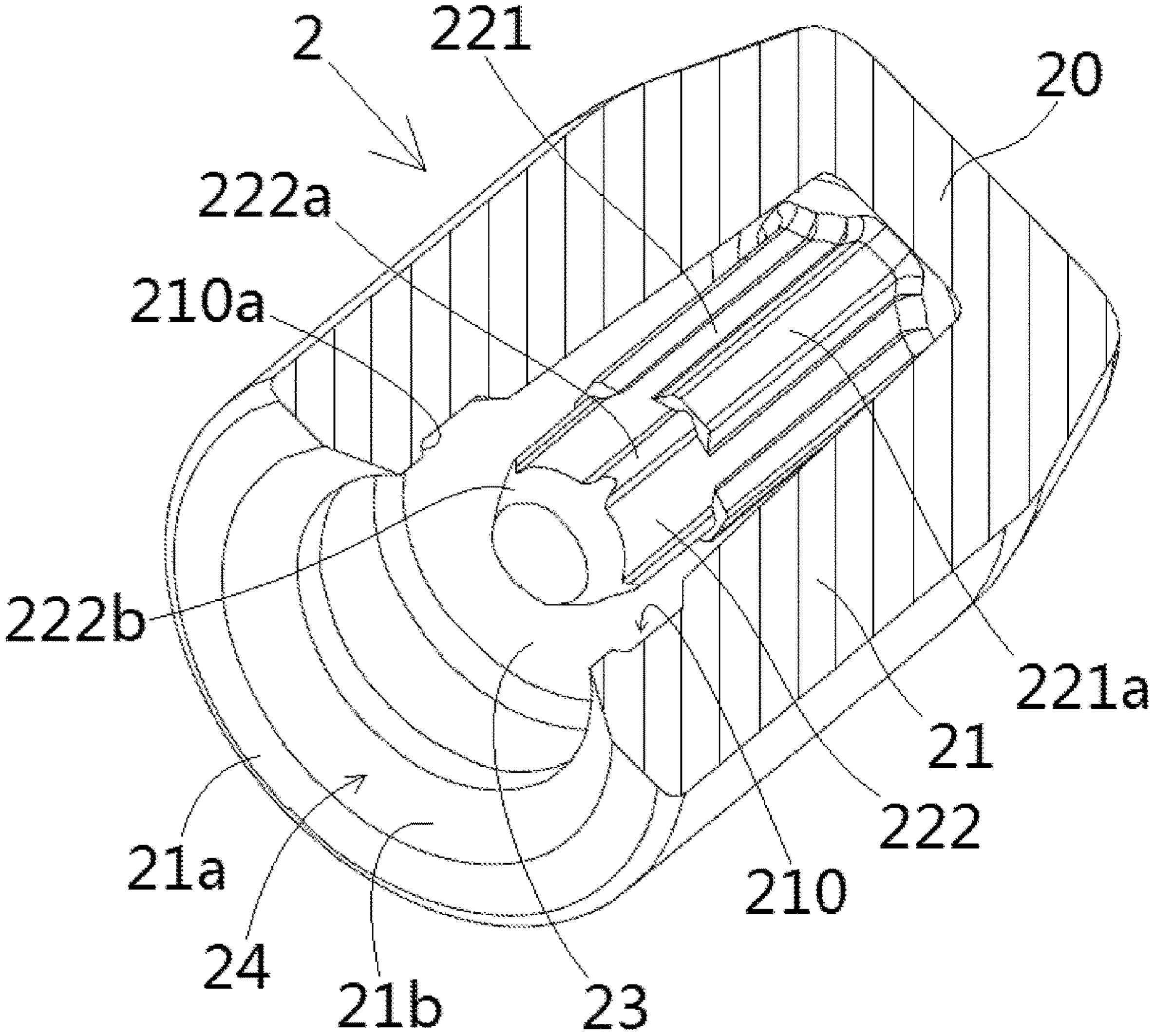
FIG. 7 shows an illustrative perspective view of a finger protective cap according to an exemplary embodiment of the present invention, wherein a portion of the finger protective cap is removed to display its internal structure.

As shown in FIGS. 5 and 7, in the illustrated embodiments, a guiding slope 21*b* is formed on the inner surface of the peripheral wall 21 at the opening 24, causing the opening 24 to appear in an outward expanding trumpet shape to guide the installation part 11 into the finger protective cap 2.

As shown in FIGS. 5 and 7, an inclined guide surface 222*b* is formed at the end of the insertion post 22 to guide the insertion of the insertion post 22 into the insertion hole 112 on the installation section 11. The insertion post 22 extends along the axial direction of the finger protective cap 2 from the end wall 20, and the axial extension length of the insertion post 22 is greater than the axial extension length of the insertion hole 112 on the installation part 11.

The insertion post 22 includes a base part 221 and an insertion part 222. One end of the base part 221 is connected to the end wall 20. The insertion part 222 is connected to the other end of the base part 221. When the finger protective cap 2 is installed on the installation part 11, the insertion part 222 is inserted into the insertion hole 112, and the base part 221 is located outside the insertion hole 112. An outer diameter of the base part 221 is greater than the outer diameter of the insertion part 222, and the outer diameter of the insertion part 222 is slightly greater than the inner diameter of the insertion hole 112. When the finger protective cap 2 is sleeved on the installation part 11, the insertion part 222 is interference fit with the inner peripheral surface of the insertion hole 112.

As shown in FIGS. 5 and 7, in the illustrated embodiments, multiple first reinforcing ribs 221*a* extending axially are formed on the peripheral surface of the base part 221, and the multiple first reinforcing ribs 221*a* are distributed at intervals in the circumferential direction. Multiple second reinforcing ribs 222*a* extending axially are formed on the peripheral surface of the insertion part 222, and the multiple second reinforcing ribs 222*a* are distributed at intervals in the circumferential direction and connected axially with the multiple first reinforcing ribs 221*a*. When the finger protective cap 2 is sleeved on the installation part 11, the second reinforcing rib 222*a* on the inserting part 222 is interference fit with the inner peripheral surface of the insertion hole 112. That is to say, when the finger protective cap 2 is sleeved on the installation part 11 at the end of the connection terminal 1, the second reinforcing rib 222*a* on the insertion post 22 is inserted into the insertion hole 112, and is partially deformed due to the compression of the hole wall of the insertion hole 112, so that the insertion post 22 and the hole wall of the insertion hole 112 form an interference fit.

In the illustrated embodiments, the outer circumference of the base part 221 is flush with the outer circumference of the insertion part 222, and the radial and circumferential dimensions of the first reinforcing rib 221*a* are larger than those of the second reinforcing rib 222*a*, respectively.

In an embodiment, the finger protective cap 2 is an integral component. For example, the finger protective cap 2 can be an integral injection molded part made of insulating material.

In various embodiments, the extension length of the finger protective cap 2 in its axial direction is not less than twice, three times, or four times the axial extension length of the installation part 11.

As shown in FIGS. 1 to 7, in an exemplary embodiment of the present invention, a connection terminal assembly is also disclosed. The connection terminal assembly includes: a connection terminal 1 and a finger protective cap 2. The connection terminal 1 has an installation part 11 located at its end. The finger protective cap 2 is installed on the installation part 11 at the end of the connection terminal 1. An insertion hole 112 is formed on the installation part 11, and the insertion post 22 on the finger protective cap 2 is inserted into the insertion hole 112 of the installation part 11.

A cable assembly is also disclosed. The cable assembly includes: a cable, a connection terminal 1, and a finger protective cap 2. The cable has an exposed cable conductor. The cable conductor is soldered to the connection terminal 1. The finger protective cap 2 is installed on the installation part 11 at the end of the connection terminal 1.

A charging seat is also disclosed. The charging seat includes a housing, a connection terminal 1, and a finger protective cap 2. The connection terminal 1 is inserted into the housing. The finger protective cap 2 is installed on the installation part 11 at the end of the connection terminal 1. The charging seat also includes a cable with an exposed cable conductor welded to the connection terminal 1.

As shown in FIGS. 1 to 7, in an exemplary embodiment of the present invention, a connection terminal 1 is also disclosed. An installation part 11 is formed at the end of the connection terminal 1, which is adapted to be inserted into the aforementioned finger protective cap 2. An insertion hole 112 is formed on the installation part 11 that is suitable for fitting with the insertion post 22 inside the finger protective cap 2.

It should be appreciated for those skilled in this art that the above embodiments are intended to be illustrative, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and preceded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A finger protective cap for fitting on an installation part at an end of a connection terminal, comprising:

a peripheral wall;

an end wall connected to an end of the peripheral wall, the peripheral wall and the end wall define an inner cavity accommodating the installation part; and an insertion post located in the inner cavity and connected to the end wall, the insertion post is insertable into an insertion hole on the installation part and interference fit with a hole wall of the insertion hole, the inner cavity has an opening opposite to the end wall to allow the installation part to be inserted into the finger protective cap through the opening, the insertion post includes a base part having an end connected to the end wall and an insertion part connected to another end of the base part, a first reinforcing rib extending axially is formed on an outer peripheral surface of the base part, and a second reinforcing rib extending axially is formed on an outer peripheral surface of the insertion part, the second reinforcing rib is axially connected to the first reinforcing rib.

2. The finger protective cap according to claim 1, wherein an end face of the peripheral wall abuts an end face of a body part of the connection terminal, the end face of the peripheral wall covers the end face of the body part.

3. The finger protective cap according to claim 1, wherein a guiding slope is formed on an inner surface of the opening of the peripheral wall, the opening is in a shape of an outward expanding trumpet.

4. The finger protective cap according to claim 1, wherein an inclined guide surface is formed on the end of the insertion post.

5. The finger protective cap according to claim 1, wherein the outer peripheral surface of the base part is flush with the outer peripheral surface of the insertion part, a radial and a circumferential dimension of the first reinforcing rib are larger than those of the second reinforcing rib.

6. The finger protective cap according to claim 1, wherein an extension length of the finger protective cap in an axial direction is at least two times an axial extension length of the installation part.

7. A connection terminal, comprising:

an installation part formed at an end of the connection terminal, for installing the finger protective cap as claimed in claim 1, the installation part having an insertion hole fitting with the insertion post inside the finger protective cap.

8. The finger protective cap according to claim 1, wherein a radial recess is formed on an inner surface of the peripheral wall, the radial recess engages a radial protrusion on an outer surface of the installation part.

9. The finger protective cap according to claim 8, wherein a mating blocking surface is formed on a side of the radial recess, the mating blocking surface abuts against a blocking surface of the radial protrusion to prevent the finger protective cap from being removed from the installation part.

10. The finger protective cap according to claim 8, wherein an inner diameter of the finger protective cap at the radial recess is smaller than an outer diameter of the radial protrusion on the installation part, and when the finger protective cap is sleeved on the installation part, an inner peripheral surface of the finger protective cap is interference fit with the radial protrusion.

11. The finger protective cap according to claim 1, wherein the insertion post extends from the end wall along an axial direction of the finger protective cap, an axial extension length of the insertion post is greater than an axial extension length of the insertion hole.

12. The finger protective cap according to claim 11, wherein when the finger protective cap is sleeved on the installation part, the insertion part is inserted into the insertion hole and the base part is located outside the insertion hole.

13. The finger protective cap according to claim 12, wherein an outer diameter of the base part is greater than an outer diameter of the insertion part, the outer diameter of the insertion part is greater than an inner diameter of the insertion hole, and when the finger protective cap is sleeved on the installation part, the insertion part is interference fit with an inner peripheral surface of the insertion hole.

14. A charging seat, comprising:

a housing;

a connection terminal inserted into the housing; and the finger protective cap according to claim 1 which is sleeved on an installation part at an end of the connection terminal.

15. The charging seat according to claim 14, further comprising a cable having an exposed cable conductor which is welded to the connection terminal.

16. A connection terminal assembly, comprising:

a connection terminal with an installation part located at an end; and a finger protective cap sleeved on the installation part at the end of the connection terminal, the finger protective cap includes a peripheral wall, an end wall connected to an end of the peripheral wall, the peripheral wall and the end wall define an inner cavity accommodating the installation part, and an insertion post located in the inner cavity and connected to the end wall, the insertion post is insertable into an insertion hole on the installation part and interference fit with a hole wall of the insertion hole, the inner cavity has an opening opposite to the end wall to allow the installation part to be inserted into the finger protective cap through the opening, a reinforcing rib is formed on an outer peripheral surface of the insertion post, when the finger protective cap is sleeved on the installation part, the reinforcing rib is inserted into the insertion hole and is partially deformed due to a compression of the hole wall of the insertion hole, the insertion post and the hole wall of the insertion hole form an interference fit.

17. The connection terminal assembly according to claim 16, wherein the installation part is connected to a body part of the connection terminal by an arc-shaped connection part.

18. A cable assembly, comprising:

a cable with an exposed cable conductor;

a connection terminal soldered to the exposed cable conductor; and a finger protective cap sleeved on an installation part at an end of the connection terminal, the finger protective cap includes a peripheral wall, an end wall connected to an end of the peripheral wall, the peripheral wall and the end wall define an inner cavity accommodating the installation part, and an insertion post located in the inner cavity and connected to the end wall, the insertion post is insertable into an insertion hole on the installation part and interference fit with a hole wall of the insertion hole, the inner cavity has an opening opposite to the end wall to allow the installation part to be inserted into the finger protective cap through the opening, a reinforcing rib is formed on an outer peripheral surface of the insertion post, when the finger protective cap is sleeved on the installation part, the reinforcing rib is inserted into the insertion hole and is partially deformed due to a compression of the hole wall of the insertion hole, the insertion post and the hole wall of the insertion hole form an interference fit.

* * * * *